(12) United States Patent
Otomo

(10) Patent No.: US 12,306,144 B2
(45) Date of Patent: May 20, 2025

(54) MOBILE PHASE DELIVERY SYSTEM AND MOBILE PHASE DELIVERY METHOD

(71) Applicant: SHIMADZU CORPORATION, Kyoto (JP)

(72) Inventor: Iori Otomo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 329 days.

(21) Appl. No.: 18/115,801

(22) Filed: Mar. 1, 2023

(65) Prior Publication Data

US 2023/0333068 A1 Oct. 19, 2023

(30) Foreign Application Priority Data

Apr. 18, 2022 (JP) ................................. 2022-068251

(51) Int. Cl.
*G01N 30/06* (2006.01)
*G01N 30/02* (2006.01)

(52) U.S. Cl.
CPC ....... *G01N 30/06* (2013.01); *G01N 2030/027* (2013.01)

(58) Field of Classification Search
CPC .. G01N 30/06; G01N 2030/027; G01N 30/24; G01N 30/26; G01N 30/02; G01N 30/16; G01N 30/32
See application file for complete search history.

(56) References Cited

U.S. PATENT DOCUMENTS

| | | | | | |
|---|---|---|---|---|---|
| 4,226,114 A | * | 10/1980 | Hagedorn | .......... | G01N 25/4873 73/61.76 |
| 4,559,963 A | * | 12/1985 | Sugisawa | .................. | A61L 2/07 137/565.33 |
| 5,147,538 A | * | 9/1992 | Wright | ............... | B01D 11/0203 210/659 |

(Continued)

FOREIGN PATENT DOCUMENTS

WO 2020183654 A1 9/2020

*Primary Examiner* — David J Bolduc
(74) *Attorney, Agent, or Firm* — Renner, Otto, Boisselle & Sklar, LLP

(57) ABSTRACT

A solvent container (12), an additional solvent container (14), a liquid delivery pump (10), a flow path structure (16) including a connection flow path (18) a suction flow path (20), and a flow path opening/closing mechanism (22) for opening and closing the suction flow path (20) of the flow path structure (16) are included. The connection flow path (18) has a first end and a second end, the first end is inserted into the solvent container (12), and the second end is inserted into the additional solvent container (14). The suction flow path (20) is fluidly connected to the connection flow path (18) at a position between the first end and the second end of the connection flow path (18). When both ends of the connection flow path (18) are immersed in the solvent and the connection flow path (18) is filled with the solvent, the solvent flows in the connection flow path (18) due to a relationship between a liquid level height of the solvent in the solvent container (12) and a liquid level height of the solvent in the additional solvent container (14), so that the solvent is supplied from the additional solvent container (14) to the solvent container (12) in response to a decrease in the solvent in the solvent container (12).

9 Claims, 5 Drawing Sheets

(56) References Cited

U.S. PATENT DOCUMENTS

| | | | | |
|---|---|---|---|---|
| 2005/0109396 A1* | 5/2005 | Zucchelli | .............. | F16K 99/003 |
| | | | | 137/67 |
| 2006/0201885 A1* | 9/2006 | Davison | ................ | G01F 23/168 |
| | | | | 210/741 |
| 2013/0233060 A1* | 9/2013 | Ogawa | .................... | G01N 30/50 |
| | | | | 73/61.52 |
| 2013/0288355 A1* | 10/2013 | DeWitte | ................ | G01N 30/88 |
| | | | | 435/288.6 |
| 2015/0056689 A1* | 2/2015 | DeWitte | ................ | G01N 30/72 |
| | | | | 422/65 |
| 2018/0274531 A1* | 9/2018 | Yanagibayashi | ........ | F04B 23/06 |
| 2019/0187109 A1* | 6/2019 | Jung | ...................... | G01N 30/32 |
| 2020/0400623 A1* | 12/2020 | Plachetka | .............. | G01N 30/34 |
| 2021/0379595 A1* | 12/2021 | Anderson | ............... | B01L 3/523 |
| 2022/0137008 A1* | 5/2022 | Kamata | .................. | G01N 30/26 |
| | | | | 73/61.56 |
| 2022/0252555 A1 | 8/2022 | Gomi | | |
| 2022/0371002 A1* | 11/2022 | Schuhn | ................ | B01L 3/0293 |

* cited by examiner

MOBILE PHASE DELIVERY SYSTEM AND MOBILE PHASE DELIVERY METHOD

BACKGROUND OF THE INVENTION

1. Field of the Invention

The present invention relates to a mobile phase delivery system and a mobile phase delivery method.

2. Description of the Related Art

A chromatography analysis system for performing liquid chromatography analysis or supercritical fluid chromatography analysis is a system in which a sample is injected into a mobile phase flowing toward a separation column, the sample is guided to the separation column to temporally separate a plurality of components in the sample, and each component sequentially eluted from the separation column is detected by a detector. In such a chromatography analysis system, one or a plurality of solvents are pumped up from each solvent container by a liquid delivery pump and fed as a mobile phase (see WO 2020/183654 A).

SUMMARY OF THE INVENTION

In a case where continuous analysis of a plurality of samples is performed using a chromatography analysis system, a large amount of solvent is required because a mobile phase continues to flow for a long time. On the other hand, an amount of the solvent that can be continuously delivered depends on the volume of a solvent container containing the solvent, and when a solvent in the solvent container is depleted, the solvent container must be replenished with the solvent. Work of replenishing with a solvent needs to be manually performed by an analyst, but the solvent container is often installed at a high position, and there is also a risk that the solvent splashes the analyst at the time of replenishment with the solvent. For this reason, the solvent container is desirably able to be easily replenished with a solvent at an appropriate timing.

The present invention has been made in view of the above problem, and an object of the present invention is to allow a solvent container to be easily replenished with a solvent at an appropriate timing.

A mobile phase delivery system according to the present invention includes a solvent container accommodating a solvent that is a mobile phase in therein, an additional solvent container provided separately from the solvent container and accommodating the solvent therein, a solvent supply flow path fluidly connected to the solvent container, a liquid delivery pump for delivering the solvent by pumping up the solvent from the solvent container through the solvent supply flow path, a flow path structure including a connection flow path and a suction flow path, the connection flow path being having a first end and a second end, the first end being inserted into the solvent container from above and the second end being inserted into the additional solvent container from above, and the suction flow path being fluidly connected to the connection flow path at a position between the first end and the second end of the connection flow path, and a flow path opening/closing mechanism for opening and closing the suction flow path of the flow path structure. The flow path structure is configured to maintain a state in which the connection flow path is filled with the solvent as a result of closing the suction flow path by the flow path opening/closing mechanism when the connection flow path is filled with the solvent. When both the first end and the second end of the connection flow path of the flow path structure are immersed in the solvent and the connection flow path is in a state of being filled with the solvent, the mobile phase delivery system is configured so that the solvent flows in the connection flow path due to a relationship between a liquid level height of the solvent in the solvent container and a liquid level height of the solvent in the additional solvent container, so that the solvent is supplied from the additional solvent container to the solvent container in response to a decrease in the solvent in the solvent container.

A mobile phase delivery method according to the present invention is a method for pumping up a solvent from a solvent container containing the solvent in the inside by a liquid delivery pump and delivering the solvent, the mobile phase delivery method including a container preparation step of preparing an additional solvent container, which is different from the solvent container, containing the solvent, a flow path structure preparation step of preparing a flow path structure including a connection flow path and a suction flow path, the connection flow path being having a first end and a second end, and the suction flow path being fluidly connected to the connection flow path at a position between the first end and the second end of the connection flow path, a flow path structure arranging step of arranging the flow path structure in a state where the first end of the connection flow path is inserted into the solvent container from above the solvent container and the second end of the connection flow path is inserted into the additional solvent container from above the additional solvent container, a solvent filling step of simultaneously applying a fluid suction force to both the first end and the second end of the connection flow path through the suction flow path to simultaneously suck the solvent from the first end and the second end of the connection flow path so that the connection flow path becomes in a state of being filled with the solvent, a filling state fixing step of fixing the connection flow path to be in a state of being filled with the solvent by closing the suction flow path after the solvent filling step, and a mobile phase delivery step of delivering the solvent in the solvent container as a mobile phase by the liquid delivery pump after the filling state fixing step. The solvent is supplied from the additional solvent container to the solvent container through the connection flow path of the flow path structure in response to a decrease in the solvent in the solvent container during execution of the mobile phase delivery step.

That is, in the mobile phase delivery system and the mobile phase delivery method according to the present invention, the flow path structure configured such that the connection flow path connecting the solvent container and the additional solvent container can be set to be in a state of being filled with the solvent is used, and the solvent in the additional solvent container is supplied to the solvent container through the connection flow path when the solvent in the solvent container decreases using the principle of siphon.

In the mobile phase delivery system according to the present invention, the flow path structure configured so that the connection flow path connecting the solvent container and the additional solvent container can be set to be in a state of being filled with the solvent is used, and the solvent in the additional solvent container is supplied to the solvent container through the connection flow path when the solvent in the solvent container decreases according to the principle of siphon, so that the solvent container can be easily replenished with the solvent at an appropriate timing.

In the mobile phase delivery method according to the present invention, the flow path structure configured so that the connection flow path connecting the solvent container and the additional solvent container can be set to be in a state of being filled with the solvent is used, and the solvent in the additional solvent container is supplied to the solvent container through the connection flow path when the solvent in the solvent container decreases using the principle of siphon, so that the solvent container can be easily replenished with the solvent at an appropriate timing.

DETAILED DESCRIPTION OF THE INVENTION

Hereinafter, an example of a mobile phase delivery system and a mobile phase delivery method according to the present invention will be described with reference to the drawings.

Figure 1:
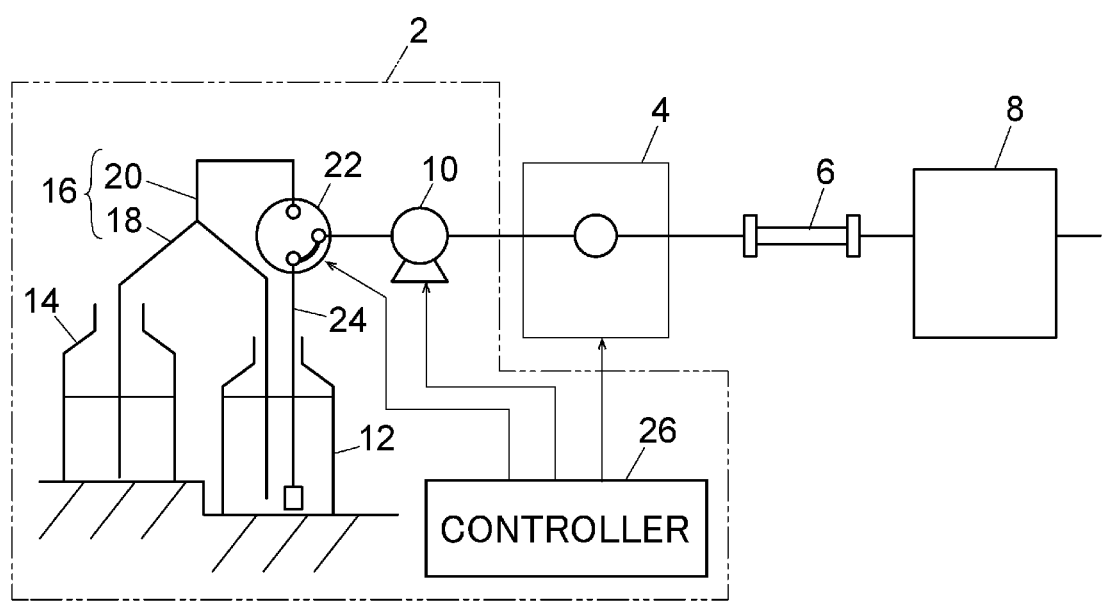
FIG. 1 is a schematic configuration diagram illustrating an example of a mobile phase delivery system incorporated in a liquid chromatography analysis system.

An example of the mobile phase delivery system incorporated in a liquid chromatography analysis system is illustrated in FIG. 1.

The liquid chromatography analysis system includes a mobile phase delivery system 2, an injector 4, a separation column 6, and a detector 8. The mobile phase delivery system 2 is a system that delivers a mobile phase toward the separation column 6. The injector 4 injects a sample into a mobile phase flowing toward the separation column 4. The separation column 6 is for temporally separating a plurality of components contained in a sample injected into a mobile phase by the injector 4 from each other. The detector 8 is fluidly connected to an outlet of the separation column 6 and detects each component eluted from the separation column 6.

The mobile phase delivery system 2 includes a liquid delivery pump 10, a solvent container 12, an additional solvent container 14, a flow path structure 16, a switching valve 22, and a controller 26. The liquid delivery pump 10 pumps up a solvent in the solvent container 12 through a solvent supply flow path 24 and delivers the solvent as a mobile phase to the separation column 6. The additional solvent container 14 contains the same solvent as that in the solvent container 12. In this example, the additional solvent container 14 is positioned higher than the solvent container 12. This is a configuration intended to facilitate supply of all of the solvent in the additional solvent container 14 to the solvent container 12 by the principle of siphon.

The flow path structure 16 includes a connection flow path 18 and a suction flow path 20. The connection flow path 18 has a first end and a second end, the first end is inserted into the solvent container 12 from above and immersed in a solvent in the solvent container 12, and the second end is inserted into the additional solvent container 14 from above and reaches a bottom surface or the vicinity of the bottom surface in the additional solvent container 14. The first end of the connection flow path 18 is arranged at a height lower than the second end. The suction flow path 20 of the flow path structure 16 is fluidly connected to the connection flow path 18 at a position between the first end and the second end of the connection flow path 18. A tip of the suction flow path 20 is connected to one port of the switching valve 22.

The switching valve 22 is configured to switch between a first state (state in FIG. 1) in which the suction flow path 20 is closed while a sample supply flow path 24 is fluidly connected to the liquid delivery pump 10 and a second state (state in FIG. 3) in which fluid connection between the sample supply flow path 24 and the liquid delivery pump 10 is cut off while the suction flow path 20 is fluidly connected to the liquid delivery pump 10. The switching valve 22 functions as a flow path opening/closing mechanism for opening and closing the suction flow path 20.

Figure 2:
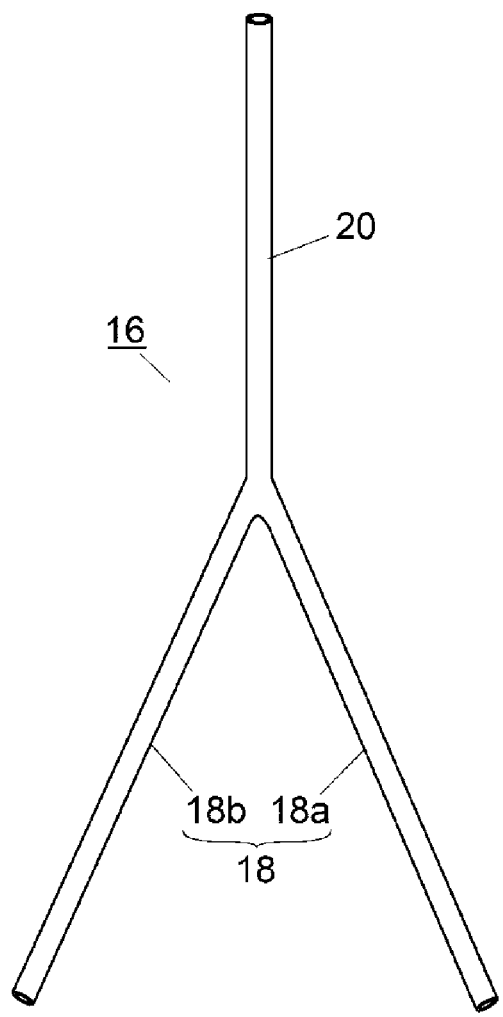
FIG. 2 is an example of a three-way tube that can be used as a flow path structure of the example.

As illustrated in FIG. 2, the flow path structure 16 can be realized by a three-way tube in which three tubes 18a, 18b, and 20 extending in three directions are connected to each other at one place. In this case, the connection flow path 18 is realized by the two tubes 18a and 18b. Note that the flow path structure 16 is not limited to the one illustrated in FIG. 2, and may be any structure as long as the connection flow path 18 and the suction flow path 20 are included.

The controller 26 is incorporated as a part of constituents of the mobile phase delivery system 2, but may be a control device for operation management of the entire liquid chromatography analysis system that controls operation of the injector 4 in addition to operation of the liquid delivery pump 10 and the switching valve 22 of the mobile phase delivery system 2. The controller 26 is realized by a computer device in which dedicated control software is installed.

The mobile phase delivery system 2 has a solvent automatic replenishment function in which, when a solvent in the solvent container 12 decreases due to delivery of a mobile phase by the liquid delivery pump 10, a solvent in the additional solvent container 14 is automatically supplied to the solvent container 12 according to the principle of siphon. In order to cause the solvent automatic replenishment function to function, it is necessary to bring the connection flow path 18 of the flow path structure 16 into a state of being filled with a solvent before liquid delivery of a mobile phase by the liquid delivery pump 10 is started.

Figure 3:
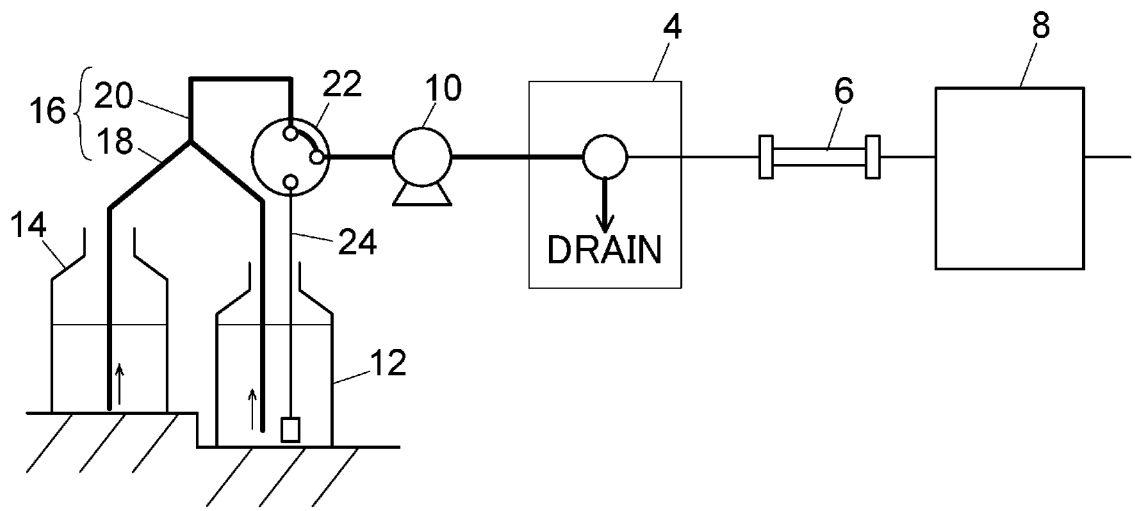
FIG. 3 is a diagram for describing a flow path configuration when a connection flow path is filled with a solvent in the example.

In the present example, as illustrated in FIG. 3, by switching the switching valve 22 to the second state, fluidly connecting the suction flow path 20 to the liquid delivery pump 10, and driving the liquid delivery pump 10, a fluid suction force simultaneously acts on the first end and the second end of the connection flow path 18 through the suction flow path 20, and the connection flow path 18 is filled with a solvent. At this time, by switching a flow path configuration of the injector 4 so that a flow path on the outlet side of the liquid delivery pump 10 is fluidly connected to the drain, it is possible to fill the connection flow path 18 with the solvent in a short time. After the connection flow path 18 is filled with the solvent, the switching valve 22 is switched to the first state (state of FIG. 4) to close the connection flow path 18, so that the state in which the connection flow path 18 is filled with the solvent is maintained after that.

Figure 4:
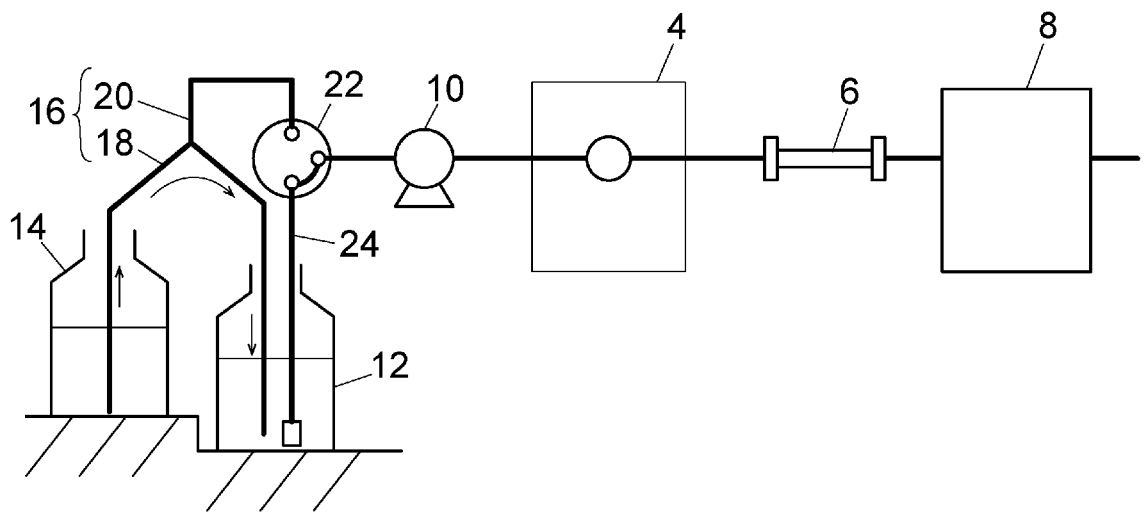
FIG. 4 is a diagram for describing a flow path configuration when a solvent in a solvent container is delivered.

When the connection flow path 18 is filled with the solvent, the principle of siphon is established between the inside of the solvent container 12 and the inside of the additional solvent container 14 fluidly connected by the connection flow path 18. According to the principle of siphon, due to a difference between the gravity of the solvent in the connection flow path 18 that tends to fall toward a liquid level in the solvent container 12 and the gravity of the solvent in the connection flow path 18 that tends to fall toward a liquid level in the additional solvent container 14, and a difference between the atmospheric pressure acting on a liquid level of the solvent in the solvent container 12 and the atmospheric pressure acting on a liquid level of the solvent in the additional solvent container 14, the solvent flows from a container having a higher liquid level of the accommodated solvent to a container having a lower liquid level. Therefore, as illustrated in FIG. 4, when liquid delivery of a mobile phase by the liquid delivery pump 10 is started in a state where the connection flow path 18 is filled with the solvent, the solvent in the solvent container 12 decreases, and the liquid level height of the solvent in the solvent container 12 becomes lower than the liquid level height of the solvent in the additional solvent container 14, the solvent is supplied from the additional solvent container 14 to the solvent container 12 through the connection flow path 18.

In order to automatically enable the solvent automatic replenishment function, the controller 26 can be configured to switch the switching valve 22 to the second state and drive the liquid delivery pump 10 to fill the connection flow path 18 with the solvent at a predetermined timing before the liquid delivery of a mobile phase by the liquid delivery pump 10 is started, and then switch the switching valve 22 to the first state and start liquid delivery of the mobile phase.

Note that the configuration of the above example is based on the premise that the inside of the connection flow path 18 is filled with a solvent by using the liquid delivery pump 10 for delivering a mobile phase, but the present invention is not limited to this configuration. A fluid suction element such as a syringe pump may be provided separately from the liquid delivery pump 10, the fluid suction element may be fluidly connected to the suction flow path 20, and a solvent may be drawn into the connection flow path 18 using the fluid suction element at a timing before liquid delivery of a mobile phase is started. In this case, a cock portion (flow path opening/closing mechanism) for closing the suction flow path 20 may be provided in the suction flow path 20. Further, the suction flow path 20 may be substantially closed by not moving the fluid suction element in a state where the connection flow path 18 is filled with the solvent. In this case, the fluid suction element itself functions as a flow path opening/closing mechanism.

The relationship in height between the solvent container 12 and the additional solvent container 14 and the relationship in height between the first end and the second end of the connection flow path 18 of the flow path structure 16 in the above example are merely examples. As described above, the movement of a solvent by the principle of siphon is caused by a difference between the gravity of the solvent in the connection flow path 18 that tends to fall toward a liquid level in the solvent container 12 and the gravity of the solvent in the connection flow path 18 that tends to fall toward a liquid level in the additional solvent container 14, and a difference between the atmospheric pressure acting on a liquid level of the solvent in the solvent container 12 and the atmospheric pressure acting on a liquid level of the solvent in the additional solvent container 14. Therefore, as long as the principle of siphon functions, the relationship in height between the solvent container 12 and the additional solvent container 14 and the relationship in height between the first end and the second end of the connection flow path 18 of the flow path structure 16 may be any relationship.

Figure 5:
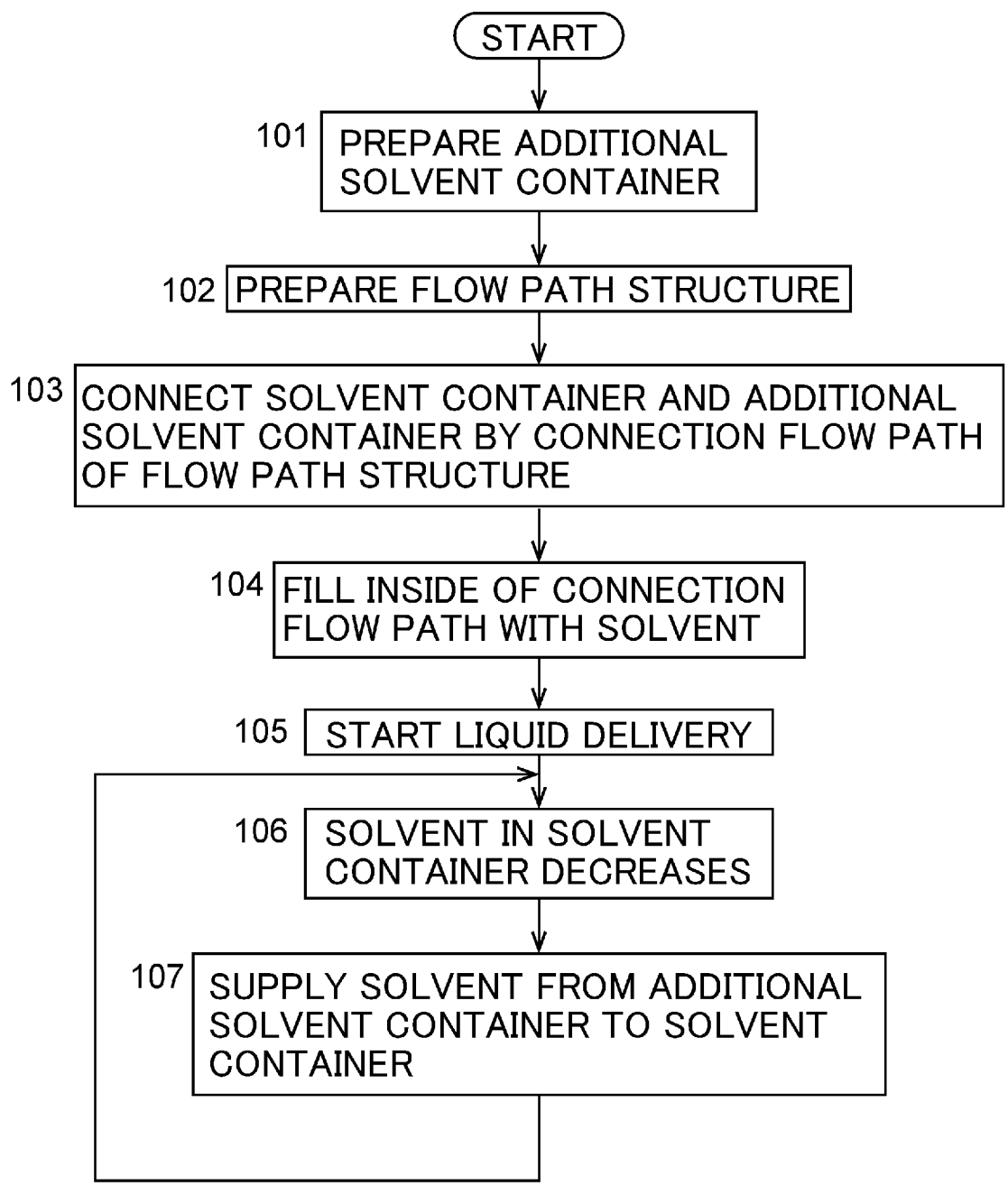
FIG. 5 is a flowchart for describing an example of a liquid delivery method using the mobile phase delivery system of the example.

An example of a mobile phase delivery method using the mobile phase delivery system 2 will be described with reference to a flowchart of FIG. 5 together with FIG. 1.

First, the solvent container 12 and the additional solvent container 14 as a separate container are prepared (Step 101), and further, the flow path structure 16 having the connection flow path 18 and the suction flow path 20 is prepared (Step 102). Then, by inserting the first end of the connection flow path 18 of the flow path structure 16 into the solvent container 12 from above and inserting the second end of the connection flow path 18 into the additional solvent container 14 from above, the inside of the solvent container 12 and the inside of the additional solvent container 14 are fluidly connected by the connection flow path 18 (Step 103).

Next, a fluid suction force is simultaneously applied from the suction flow path 20 side of the flow path structure 16 to the first end and the second end of the connection flow path 18 to draw a solvent into the connection flow path 18 and fill the connection flow path 18 with the solvent (Step 104). After the above, the suction flow path 20 is closed, and delivery of a mobile phase by the liquid delivery pump 10 is started (Step 105). When the delivery of the mobile phase by the liquid delivery pump 10 is started, the solvent in the solvent container 12 decreases, and a liquid level height of the solvent in the solvent container 12 decreases (Step 106). Every time the liquid level height of the solvent in the solvent container 12 decreases, the solvent is supplied from the additional solvent container 14 to the solvent container 12 through the connection flow path 18 due to a relationship between the liquid level height of the solvent in the solvent container 12 and the liquid level height of the solvent in the additional solvent container 14 according to the principle of siphon (Step 107).

Figure 6:
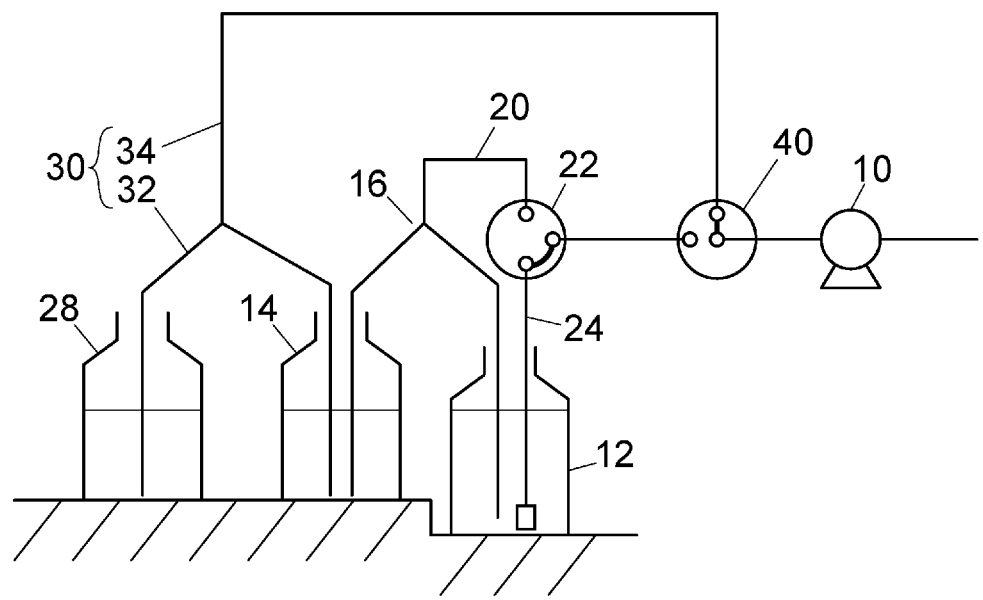
FIG. 6 is a schematic configuration diagram for describing another example of the liquid delivery system.

Further, as illustrated in FIG. 6, an additional solvent container 28 for supplying a solvent to the additional solvent container 14 can further be provided. A structure equivalent to the flow path structure 16, that is, a flow path structure 30 having a connection flow path 32 and a suction flow path 34 can be used so that a solvent is automatically supplied from the additional solvent container 28 to the additional solvent container 14 by the principle of siphon. The connection flow path 32 of the flow path structure 30 has a first end inserted into the additional solvent container 14 from above, and a second end inserted into the additional solvent container 28 from above.

Figure 7:
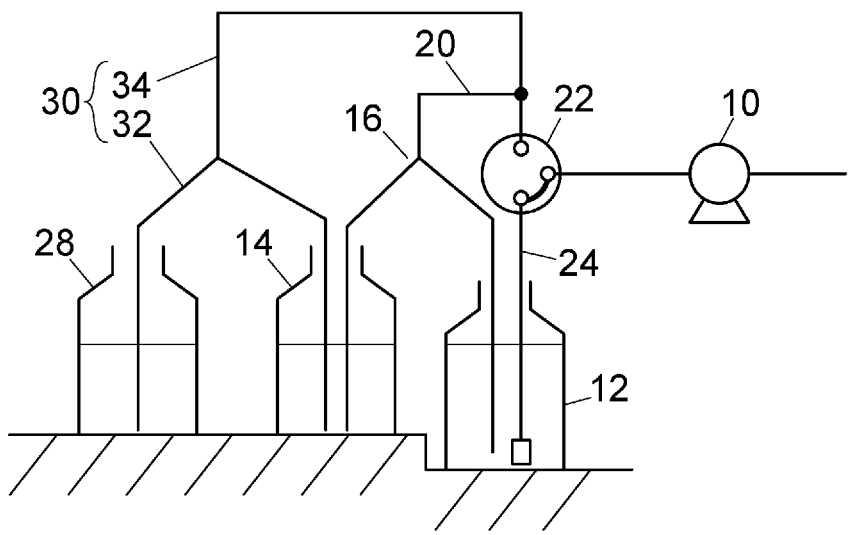
FIG. 7 is a schematic configuration diagram for describing still another example of the liquid delivery system.

In the example of FIG. 6, the liquid delivery pump 10 is configured to be selectively connected to any of the solvent supply flow path 24, the suction flow path 20, and the suction flow path 34 by the switching valves 22 and 40, and each of the suction flow path 20 and the suction flow path 34 can be filled with a solvent using the liquid delivery pump 10. Note that, as illustrated in FIG. 7, the configuration may be such that the suction flow path 34 of the flow path structure 30 is merged with the suction flow path 20, and the suction flow path 20 and the suction flow path 34 are simultaneously fluidly connected to the liquid delivery pump 10 via the switching valve 22. With such a configuration, a solvent can be simultaneously drawn into the suction flow path 20 and the suction flow path 34 using the liquid delivery pump 10.

The examples described above are merely examples of an embodiment of the mobile phase delivery system and the mobile phase delivery method according to the present invention. The embodiment of the mobile phase delivery system and the mobile phase delivery method according to the present invention is as described below.

The embodiment of the mobile phase delivery system according to the present invention includes a solvent container accommodating a solvent that is a mobile phase therein, an additional solvent container provided separately from the solvent container and accommodating the solvent therein, a solvent supply flow path fluidly connected to the solvent container, a liquid delivery pump for delivering the solvent by pumping up the solvent from the solvent container through the solvent supply flow path, a flow path structure including a connection flow path and a suction flow path, the connection flow path being having a first end and a second end, the first end being inserted into the solvent container from above and the second end being inserted into the additional solvent container from above, and the suction flow path being fluidly connected to the connection flow path at a position between the first end and the second end of the connection flow path, and a flow path opening/closing mechanism for opening and closing the suction flow path of the flow path structure. The flow path structure is configured to maintain a state in which the connection flow path is filled with the solvent as a result of closing the suction flow path by the flow path opening/closing mechanism when the connection flow path is filled with the solvent, and when both the first end and the second end of the connection flow path of the flow path structure are immersed in the solvent and the connection flow path is in a state of being filled with the solvent, the mobile phase delivery system is configured so that the solvent flows in the connection flow path due to a relationship between a liquid level height of the solvent in the solvent container and a liquid level height of the solvent in the additional solvent container, so that the solvent is supplied from the additional solvent container to the solvent container in response to a decrease in the solvent in the solvent container.

In a first aspect of the embodiment of the mobile phase delivery system according to the present invention, the first end of the connection flow path is arranged at the same height as the second end or at a position lower than the second end.

In the first aspect, the additional solvent container may be arranged at the same height as the solvent container or at a position higher than the solvent container, and the second end of the connection flow path may reach a bottom surface in the additional solvent container. With such a configuration, almost all of the solvent in the additional solvent container can be supplied to the solvent container. Note that "the second end of the connection flow path reaches a bottom surface in the additional solvent container" does not require that the second end of the connection flow path completely reach the bottom surface in the additional solvent container, but the second end of the connection flow path only needs to "substantially" reach the bottom surface in the additional solvent container so that almost all of the solvent in the additional solvent container can be supplied to the solvent container. That is, "reaches a bottom surface" includes "reaches the vicinity of a bottom surface".

In a second aspect of the embodiment of the mobile phase delivery system according to the present invention, the flow path opening/closing mechanism is configured to be selectively switched between a first state and a second state, the first state being a state in which the suction flow path is closed while the solvent supply flow path is fluidly connected to the liquid delivery pump and the second state being a state in which the suction flow path is fluidly connected to the liquid delivery pump while fluid connection between the solvent supply flow path and the liquid delivery pump is cut off, and the connection flow path is configured to be filled with the solvent as the flow path opening/closing mechanism is set to the second state in a state where both the first end and the second end of the connection flow path are immersed in the solvent and the liquid delivery pump is operated. According to such an aspect, since the inside of the connection flow path can be filled with the solvent using the liquid delivery pump for delivering a mobile phase, it is not necessary to newly provide a dedicated pump mechanism for filling the inside of the connection flow path with the solvent. This second aspect can be combined with the first aspect.

In the second aspect, a controller configured to control operation of the flow path opening/closing mechanism and the liquid delivery pump may be provided, and the controller can be configured, before liquid delivery of the solvent in the solvent container by the liquid delivery pump is started, to operate the liquid delivery pump while setting the flow path opening/closing mechanism to the second state so that the connection flow path bring into a state filled with the solvent, and then, to switch the flow path opening/closing mechanism to the first state and start liquid delivery of the solvent in the solvent container. By the above, it is possible to automate a process from filling of the connection flow path with the solvent to delivery of a mobile phase.

In a third aspect of the embodiment of the mobile phase delivery system according to the present invention, the flow path structure is a three-way tube in which tubes extending in three directions are connected at one place. This third aspect can be combined with the first aspect, the second aspect, and/or the third aspect described above.

The embodiment of the mobile phase delivery method according to the present invention is for pumping up a solvent from a solvent container containing the solvent in the inside by a liquid delivery pump and delivering the solvent, the mobile phase delivery method including a container preparation step of preparing an additional solvent container, which is different from the solvent container, containing the solvent, a flow path structure preparation step of preparing a flow path structure including a connection flow path and a suction flow path, the connection flow path being having a first end and a second end, and the suction flow path being fluidly connected to the connection flow path at a position between the first end and the second end of the connection flow path, a flow path structure arranging step of arranging the flow path structure in a state where the first end of the connection flow path is inserted into the solvent container from above the solvent container and the second end of the connection flow path is inserted into the additional solvent container from above the additional solvent container, a solvent filling step of simultaneously applying a fluid suction force to both the first end and the second end of the connection flow path through the suction flow path to simultaneously suck the solvent from the first end and the second end of the connection flow path so that the connection flow path becomes in a state of being filled with the solvent, a filling state fixing step of fixing the connection flow path to be in a state of being filled with the solvent by closing the suction flow path after the solvent filling step, and a mobile phase delivery step of delivering the solvent in the solvent container as a mobile phase by the liquid delivery pump after the filling state fixing step. The solvent is supplied from the additional solvent container to the solvent container through the connection flow path of the flow path structure in response to a decrease in the solvent in the solvent container during execution of the mobile phase delivery step.

In a specific aspect of the embodiment of the mobile phase delivery method according to the present invention, the first end of the connection flow path is arranged at the same height as the second end or at a position lower than the second end.

In the above specific aspect, the additional solvent container can be arranged at the same height as the solvent container or at a position higher than the solvent container, and the second end of the connection flow path can be caused to reach a bottom in the additional solvent container. With such a configuration, almost all of the solvent in the additional solvent container can be supplied to the solvent container.

DESCRIPTION OF REFERENCE SIGNS 2 mobile phase delivery system
4 injector
6 separation column
8 detector
10 liquid delivery pump
12 solvent container
14, 28 additional solvent container
16, 30 flow path structure
18, 32 connection flow path
20, 34 suction flow path
22, 24, 40 switching valve
26 controller

What is claimed is:

1. A mobile phase delivery system comprising:
a solvent container accommodating a solvent that is a mobile phase therein;
an additional solvent container provided separately from the solvent container and accommodating the solvent therein;
a solvent supply flow path fluidly connected to the solvent container;
a liquid delivery pump for delivering the solvent by pumping up the solvent from the solvent container through the solvent supply flow path;
a flow path structure including a connection flow path and a suction flow path, the connection flow path being having a first end and a second end, the first end being inserted into the solvent container from above and the second end being inserted into the additional solvent container from above, and the suction flow path being fluidly connected to the connection flow path at a position between the first end and the second end of the connection flow path; and
a flow path opening/closing mechanism for opening and closing the suction flow path of the flow path structure,
wherein the flow path structure is configured to maintain a state in which the connection flow path is filled with the solvent as a result of closing the suction flow path by the flow path opening/closing mechanism when the connection flow path is filled with the solvent, and
when both the first end and the second end of the connection flow path of the flow path structure are immersed in the solvent and the connection flow path is in a state of being filled with the solvent, the mobile phase delivery system is configured so that the solvent flows in the connection flow path due to a relationship between a liquid level height of the solvent in the solvent container and a liquid level height of the solvent in the additional solvent container, whereby the solvent is supplied from the additional solvent container to the solvent container in response to a decrease in the solvent in the solvent container.

2. The mobile phase delivery system according to claim 1, wherein the first end of the connection flow path is arranged at a same height as the second end or at a position lower than the second end.

3. The mobile phase delivery system according to claim 2, wherein the additional solvent container is arranged at a same height as the solvent container or at a position higher than the solvent container, and the second end of the connection flow path reaches a bottom surface in the additional solvent container.

4. The mobile phase delivery system according to claim 1, wherein
the flow path opening/closing mechanism is configured to be selectively switched between a first state and a second state, the first state being a state in which the suction flow path is closed while the solvent supply flow path is fluidly connected to the liquid delivery pump, and the second state being a state in which the suction flow path is fluidly connected to the liquid delivery pump while fluid connection between the solvent supply flow path and the liquid delivery pump is cut off, and
the connection flow path is configured to be filled with the solvent as the flow path opening/closing mechanism is set to the second state in a state where both the first end and the second end of the connection flow path are immersed in the solvent and the liquid delivery pump is operated.

5. The mobile phase delivery system according to claim 4, further comprising a controller configured to control operation of the flow path opening/closing mechanism and the liquid delivery pump, wherein
the controller is configured, before liquid delivery of the solvent in the solvent container by the liquid delivery pump is started, to operate the liquid delivery pump while setting the flow path opening/closing mechanism to the second state so that the connection flow path bring into a state filled with the solvent, and then, to switch the flow path opening/closing mechanism to the first state and start liquid delivery of the solvent in the solvent container.

6. The mobile phase delivery system according to claim 1, wherein the flow path structure is a three-way tube in which tubes extending in three directions are connected at one place.

7. A mobile phase delivery method for pumping up a solvent from a solvent container containing the solvent therein by a liquid delivery pump and delivering the solvent, the mobile phase delivery method comprising:
a container preparation step of preparing an additional solvent container, which is different from the solvent container, containing the solvent;
a flow path structure preparation step of preparing a flow path structure including a connection flow path and a suction flow path, the connection flow path being having a first end and a second end, and the suction flow path being fluidly connected to the connection flow path at a position between the first end and the second end of the connection flow path;
a flow path structure arranging step of arranging the flow path structure in a state where the first end of the connection flow path is inserted into the solvent container from above the solvent container and the second end of the connection flow path is inserted into the additional solvent container from above the additional solvent container;

a solvent filling step of simultaneously applying a fluid suction force to both the first end and the second end of the connection flow path through the suction flow path to simultaneously suck the solvent from the first end and the second end of the connection flow path so that the connection flow path becomes in a state of being filled with the solvent;

a filling state fixing step of fixing the connection flow path to be in a state of being filled with the solvent by closing the suction flow path after the solvent filling step; and a mobile phase delivery step of delivering the solvent in the solvent container as a mobile phase by the liquid delivery pump after the filling state fixing step, wherein the solvent is supplied from the additional solvent container to the solvent container through the connection flow path of the flow path structure in response to a decrease in the solvent in the solvent container during execution of the mobile phase delivery step.

8. The mobile phase delivery method according to claim 7, wherein the first end of the connection flow path is arranged at a same height as the second end or at a position lower than the second end.

9. The mobile phase delivery method according to claim 8, wherein the additional solvent container is arranged at a same height as the solvent container or at a position higher than the solvent container, and the second end of the connection flow path is caused to reach a bottom in the additional solvent container.

* * * * *